United States Patent
Cirkic et al.

(10) Patent No.: US 10,659,133 B2
(45) Date of Patent: May 19, 2020

(54) METHOD FOR UTILIZING FULL ANTENNA ARRAY POWER TO ESTIMATE BEAM FROM SUBARRAY

(71) Applicant: Telefonaktiebolaget LM Ericsson (publ), Stockholm (SE)

(72) Inventors: Mirsad Cirkic, Linköping (SE); Joel Berglund, Linköping (SE); Erik Eriksson, Linköping (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 16/303,312

(22) PCT Filed: May 20, 2016

(86) PCT No.: PCT/SE2016/050471
§ 371 (c)(1),
(2) Date: Nov. 20, 2018

(87) PCT Pub. No.: WO2017/200443
PCT Pub. Date: Nov. 23, 2017

(65) Prior Publication Data
US 2019/0215047 A1 Jul. 11, 2019

(51) Int. Cl.
*H04B 7/02* (2018.01)
*H04B 7/00* (2006.01)
(Continued)

(52) U.S. Cl.
CPC ......... *H04B 7/0691* (2013.01); *H04B 7/0617* (2013.01); *H04W 16/28* (2013.01); *H04W 24/10* (2013.01)

(58) Field of Classification Search
CPC .......... H04B 7/02; H04B 7/04; H04B 7/0408; H04B 7/0413; H04B 7/0456;
(Continued)

(56) References Cited

U.S. PATENT DOCUMENTS 9,270,022 B2 * 2/2016 Zhang .................. H04B 7/0469
9,621,243 B2 * 4/2017 Chen .................... H04B 7/0469
(Continued)

OTHER PUBLICATIONS

International Search Report and Written Opinion dated Jan. 17, 2017 for International Application No. PCT/SE2016/050471 filed on May 20, 2016, consisting of 11-pages.
(Continued)

*Primary Examiner* — Quochien B Vuong
(74) *Attorney, Agent, or Firm* — Christopher & Weisberg, P.A.

(57) ABSTRACT

A method for operating a transmitting node of a wireless communication network. The transmitting node includes or is connected to an antenna array having multiple antenna elements. A signal indication indicating a first and/or reference signaling is obtained. The first reference signaling includes transmission on a first plurality of disjunct frequency bands, and the second reference signaling includes transmission on a second plurality of disjunct frequency bands. The first reference signaling and the second reference signaling are transmitted based on a signal map of the first and the second reference signaling to antenna elements of the antenna array.

20 Claims, 5 Drawing Sheets

$Tx_k$ - Antenna element $k$
$R_j$ - Antenna port $j$ (51) Int. Cl.
 *H04B 7/06* (2006.01)
 *H04W 16/28* (2009.01)
 *H04W 24/10* (2009.01)

(58) Field of Classification Search
 CPC .. H04B 7/0469; H04B 7/0617; H04B 7/0691;
        H04B 7/0695; H04B 7/086; H04B 7/088;
                                  H04B 7/0874
 USPC ........ 455/101, 103, 269, 272, 273; 343/729,
                                  343/776, 826, 893
 See application file for complete search history.

(56) References Cited

U.S. PATENT DOCUMENTS

| | | |
|---|---|---|
| 10,205,497 B2 * | 2/2019 | Liu .......................... H04B 7/04 |
| 10,219,232 B2 * | 2/2019 | Yu ........................ H04W 56/001 |
| 2011/0205930 A1 | 8/2011 | Rahman et al. |
| 2013/0235807 A1 | 9/2013 | Lee et al. |
| 2015/0304868 A1 | 10/2015 | Yu et al. |
| 2015/0341097 A1 | 11/2015 | Yang et al. |

OTHER PUBLICATIONS

European Examination Report dated Oct. 30, 2019 issued in corresponding European Patent Application No. 16 727 564.3, consisting of 5 pages.

\* cited by examiner

METHOD FOR UTILIZING FULL ANTENNA ARRAY POWER TO ESTIMATE BEAM FROM SUBARRAY

CROSS-REFERENCE TO RELATED APPLICATIONS

This application is a Submission Under 35 U.S.C. § 371 for U.S. National Stage Patent Application of International Application Number: PCT/SE2016/050471, filed May 20, 2016 entitled "METHOD FOR UTILIZING FULL ANTENNA ARRAY POWER TO ESTIMATE BEAM FROM SUBARRAY," the entirety of which is incorporated herein by reference.

TECHNICAL FIELD

The present disclosure pertains to wireless communication technology, in particular regarding use of antenna arrays with multiple antenna elements.

BACKGROUND

The modernization of antenna technologies in practice is moving forward in a high pace, which enables the use of more advance antenna setups and techniques in order to increase throughput and robustness in a mobile radio network. One such technique is to shape the beams (beamforming) of the antenna array. With the use of so called reconfigurable antenna systems (RAS), which are already available in practice, beamforming is made possible. The gains that can be achieved with such techniques are promising and seem to be of great importance to achieve the goals of future radio networks.

SUMMARY

It is an object of the present disclosure to provide approaches allowing efficient transmission operation with multiple antenna elements, in particular in the context of beamforming.

There is disclosed a method for operating a transmitting node of a wireless communication network. The transmitting node comprises, or is connected to, an antenna array having multiple antenna elements. The method comprises obtaining a signal indication indicating a first reference signaling and/or a second reference signaling. The first reference signaling comprises transmission on a first plurality of disjunct frequency bands, and/or the second reference signaling comprises transmission on a second plurality of disjunct frequency bands. The method further comprises transmitting the first reference signaling and the second reference signaling based on a signal map of the first and the second reference signaling to antenna elements of the antenna array, the signal map mapping transmission of the first reference signaling such that transmission on a first frequency band of the first plurality of disjunct frequency bands and transmission on a second frequency band of the first plurality of disjunct frequency bands are mapped to two antenna elements. Alternatively or additionally, it may be considered that the signal map maps transmission of the second reference signaling such that transmission on a first frequency band of the second plurality of disjunct frequency bands and transmission on a second frequency band of the second plurality of disjunct frequency bands are mapped to two antenna elements. The method may comprise determining the signal map, which may be performed by the transmitting node, e.g. by a determining module. Determining a signal map may comprise remapping.

Transmitting the first reference signaling and/or the second reference signaling may generally comprise overlaying the signaling and/or beam forming, in particular forming a beam from the first reference signaling and the second reference signaling, forming a beam each for the reference signaling using the antenna elements mapped thereto. Transmitting may comprise directing the first and second reference signaling to a receiving node, which may be an intended target. The two antenna elements associated to, and/or used for transmission of, the first reference signaling may be different from the two antenna elements associated to, and/or used for transmission of, the second reference signaling. Thus, there may be (at least) four different antenna elements of the antenna array used for transmitting when transmitting the first and second reference signaling. The two antenna elements associated to the first reference signaling may be associated to different subarrays of the antenna array (a subarray may be defined according to a standard and/or when configuring the transmitting node), the same holds analogously for the antenna elements associated to the second reference signaling. It should be noted that no transmission of reference signaling utilizing a mapping of antenna elements indicated in the signal indication is required and/or performed. A signal indication may comprise a (first or original) signal map. The signal map transmitting the reference signaling is based on may be a remapping of such a (first or original) signal map. A remapping may generally provide a different mapping of reference signaling/s to antenna elements than the (first or original) signal map or signal indication remapped. A different mapping may differ in at least one antenna element, e.g., by adding an additional antenna element or using a different antenna element for transmitting.

Mapping reference signaling, and/or mapping transmission of reference signaling, e.g. to an antenna element, may generally comprise indicating the antenna element/s for use in transmission of the reference signaling (or part of the reference signaling, e.g. a disjunct frequency band, which may represent a part of the total frequency range of the reference signaling). The two antenna elements indicated to, or mapped to, by the signal map, each reference signaling may be arranged such that the phase center as seen by a receiver remains essentially constant under the signal map or remapping, and/or that the phase center difference between the first reference signaling and the second reference signaling (corresponding to the beam angle) remains (essentially) constant or indifferent, in case of a remapping. Alternatively or additionally, the signal map may map the phase centers for each antenna element used for transmitting one of the reference signalings (first and/or second, respectively) such that they appear to coincide for a receiving node, in particular the intended target.

The signal indication may indicate a first port and/or a second port, the first port being associated to the first reference signaling and/or the second port being associated to the second reference signaling. It may generally be considered that the signal map or remapping is, and/or comprises, a signal map or remapping of a port-antenna (antenna element) mapping.

In a variant, the signal map may map transmission of the first reference signaling such that transmission on the first frequency band of the first plurality of disjunct frequency bands is mapped to a different antenna element than transmission on the second frequency band of the first plurality of disjunct frequency bands, and/or the signal map may map transmission of the second reference signaling such that transmission on the first frequency band of the second plurality of disjunct frequency bands is mapped to a different antenna element than transmission on the second frequency band of the second plurality of disjunct frequency bands. Thus, for different frequency bands different antenna elements may be utilised, allowing discriminating power control, e.g. pertaining to the individual/disjoint frequency bands.

Alternatively, the signal map may map transmission of the first reference signaling such that transmission on the first frequency band of the first plurality of disjunct frequency bands and transmission on the second frequency band of the first plurality of disjunct frequency bands is mapped to both antenna elements, and/or the signal map may map transmission of the second reference signaling such that transmission on the first frequency band of the second plurality of disjunct frequency bands and transmission on the second frequency band of the second plurality of disjunct frequency bands is mapped to both antenna elements. This allows power sharing between the associated antenna elements for each reference signaling. The signal map may, for each of the reference signaling mapped, provide and/or indicate different power weights (and/or power levels) to different antenna elements, such that the each antenna element transmits at different power for different frequency bands. In particular, the signal map may map each reference signaling such that a first antenna element transmits at a first associated frequency band with (at least and/or essentially) twice, thrice or four times the power than a second antenna element (for the same frequency band), of the antenna elements mapped for transmission of the associated reference signaling. For a second frequency band, there may be different weights, in particular such the second antenna element transmits with (at least and/or essentially) twice, thrice or four times the power than the first antenna element. For difference reference signaling, there may be different weight values. A weight value in this context may refer to an indication of transmission power (and/or energy) for a transmission in a (disjunct) frequency band.

Generally, transmitting may comprise applying different power levels to different antenna elements (e.g., according to weights).

The first reference signaling and/or the second reference signaling may generally comprise or represent receiver-specific reference signaling, in particular CSI-RS signaling. This is particularly suitable for LTE or LTE-related systems.

A disjunct frequency band may represent one subcarrier and/or a grouping of adjacent subcarriers (each subcarrier of such a grouping may have at least one subcarrier adjacent to it). A subcarrier may be represented by a Resource Element (RE). It may be considered that one or more (disjunct) frequency bands of the first plurality of frequency bands are adjacent to one or more (disjunct) frequency bands of the second plurality of frequency bands. Adjacency in these contexts pertains to the frequency domain.

Disjunct frequency bands of one of the first and/or the second plurality of frequency bands may be in different Resource Blocks. In particular, each Resource Block may contain (at least) one disjunct frequency band of the first and/or the second plurality. It may generally be considered that a sum or total of a plurality of frequency bands represents a (larger) frequency band. In this context, the dijunct bands may be seen as subbands or parts of subbands.

The method may further comprise configuring a receiving node with a measurement configuration indicating the remapping.

There is also considered a method for operating a receiving node in a wireless communication network. The method comprises providing a measurement report on reference signaling received from a transmitting node of the wireless communication network based on a measurement configuration. The measurement configuration indicates a signal map of a first and/or a second reference signaling to antenna elements of an antenna array used by the transmitting node for transmission of the reference signaling. The signal map maps transmission of the first reference signaling such that transmission on a first frequency band of the first plurality of disjunct frequency bands and transmission on a second frequency band of the first plurality of disjunct frequency bands are mapped to two antenna elements, and/or signal map maps transmission of the second reference signaling such that transmission on a first frequency band of the second plurality of disjunct frequency bands and transmission on a second frequency band of the second plurality of disjunct frequency bands are mapped to two antenna elements.

The measurement configuration may be obtained from the network, in particular the transmitting node, which may be adapted for configuring the receiving node. The method may comprise obtaining a signal indication as described herein. In particular, the receiving node may receive the signal indication from a transmitting node, e.g. as part of a configuration, e.g. the measurement configuration.

The signal map and/or transmitting the reference signaling may be as discussed herein. An indication of a signal map may provide the receiving node with an indicator of measurement to be performed, and/or with an indicator that may be used in a measurement report to indicate to which kinds of transmissions received the report pertains to.

Alternatively or additionally, there may be considered a method for operating a receiving node, the method comprising measuring reference signaling using different channel estimation filters for different disjunct frequency bands of a (e.g., first or second) plurality of frequency bands associated to reference signaling, e.g. for first signaling and/or second signaling. The parts of the plurality of frequency bands may be dependent on the parts having the same port (or signaling) to antenna mapping. The measurement configuration may indicate disjunct frequency bands and/or channel filters to use for different of these bands, and/or corresponding information may be pre-defined and/or obtained e.g. from a memory. The memory may comprise e.g. standard-defined information and/or measurement history pertaining to, and/or indicating the frequency band/s and/or associated filter/s.

There is also disclosed a transmitting node for a wireless communication network, the transmitting node being connected or connectable to, and/or comprising, an antenna array having multiple antenna elements. The transmitting node is adapted to perform any one or any combination of the methods for operating a transmitting node described herein. The transmitting node may be a network node, e.g. an eNodeB or a relay node. It may be considered that the transmitting node comprises an obtaining module for obtaining the signal indication, and/or a transmitting module for transmitting the first and second reference signaling and/or a configuring module for configuring the receiving node and/or a determining module for determining the signal map and/or a remapping module for remapping.

Moreover, a receiving node for a wireless communication network is disclosed. The receiving node is adapted to perform any one or any combination of the methods for operating a receiving node described herein. The receiving node may be a terminal. It may be considered that the receiving node comprises a reporting module for providing the measurement report, and/or an obtaining module for obtaining the measurement configuration and/or the signal indication, and/or a measurement module for measuring. The receiving node may be adapted to measure a (first and/or second) reference signaling over the plurality of frequency bands associated to the respective reference signaling; measuring may be performed accordingly.

A program product may be considered. The program product comprises instructions, the instructions causing control circuitry to perform and/or control any one or any combination of the methods described herein, e.g. when executed on or by the control circuitry.

There is also disclosed a storage medium storing a program product as described herein.

The approaches described herein allow efficient use of antenna elements, in particular in the context of reference signaling and beam forming.

Obtaining information, in particular a signal indication or pertaining thereto, may comprise any form of acquiring information, in particular information indicating the signal indication, e.g. reading from a memory, receiving data indicating the precoder, and/or determining the precoder, e.g. based on received data like a measurement report.

A signal map may comprise, and/or be represented by, any information or parameter set indicating a mapping of reference signaling to antenna element(s). A signal map may e.g. comprise, and/or be represented by, a parameter list and/or a matrix, and/or a formula. A signal map may in particular indicate antenna elements intended for transmitting of reference signaling. A signal map may indicate a mapping for a first and/or a second reference signaling, and/or map to different antenna elements and/or subarrays. Mapping to different reference signaling may be considered as submaps of a signal map. Submaps may be stored and/or handled separately, e.g. for transmitting. In particular, a signal map may comprise different different and/or disjunct and/or separately managed mappings and/or indications and/or submaps.

Generally, the first reference signaling and/or the second reference signaling may be arranged and/or configured and/or transmitted to form a beam, which may have a beam angle, e.g. as seen from the receiving node. The beam may be intended for, and/or be targeted at and/or cover the receiving node. The remapping may be arranged such that the beam angle transmitted corresponds (e.g., is approximately equal to) the beam angle indicated by signal indication (respectively, that would be formed if transmission occurred without remapping).

Two frequency ranges associated to a (first or second, e.g.) reference signaling may be considered disjunct, if there is a (non-zero width) frequency range not being used for the reference signaling. For example, there may be at least on resource element not used for the reference signaling between two disjunct resource elements of the reference signaling. Disjunct in this context may be considered to refer to essentially simultaneous transmission, and/or to the frequency domain.

The described approaches are not limited to only two antenna elements for each reference signaling, but also applicable to larger numbers of antenna elements.

BRIEF DESCRIPTION OF THE DRAWINGS

The drawings are provided to illustrate concepts and approaches of the disclosure and are not intended as limitation. The drawings comprise.

DETAILED DESCRIPTION

The gains that are promised with advanced beamforming do not come for free as several new problems open up. There are many different ways to implement beamforming using an antenna array, and many of the high-level techniques are known in the academia. However, within the framework of LTE, there is more room for new and smart implementations. From release 10, CSI-RS was introduced together with the introduction of transmission mode 9. The principle of transmission mode 9 is that CSI-RS are sent in the downlink, one for each antenna port and that the UE gives feedback in the form of CQI, RI and PMI where PMI indicates the UE choice of precoder from a pre-defined codebook for downlink data transmissions. In transmission mode 9, there can be at most eight number of antenna ports within the same CSI-process.

For antennas with more than eight steerable antenna elements, normal operation with transmission mode 9 cannot utilize all the antennas as there are only eight antenna ports. There are however techniques to overcome this problem. With differential beamforming (DBF), the port-antenna mappings are changed over time such that the aggregation of the reported precoders for different antenna-port mappings gives an effective reporting corresponding to more than eight ports. In addition to this, if few ports are used for each time instance with a certain antenna-port mapping, the effective codebook has higher granularity compared to a normal codebook for more antenna ports. With the DBF procedure, in the initial step the antenna-ports are typically first made wide and are step-by-step made narrower (or possibly wider) depending on the situation.

One problem which occurs with DBF is that for initial transmissions when wide beams are used, there are typically few antenna-elements mapped to an antenna-port-mapping. In worst case, there will only be one antenna-element per port. When the CSI-RS are sent out with these ports, the effective output power will be relatively low as the power amplifiers (PA) of many antenna-elements are not part of the CSI-RS transmission. This means that when having a wide beam, also the output power will be low, which is a problem in terms of coverage.

There are discussed approaches facilitating the creation of wide beams with the full power of an antenna array by utilizing all elements of the antenna array and transmitting the reference signals over one antenna port over different subarrays of the array over different RB.

The substantial part or the full power of the whole array will be available for transmitting a wide beam that in a conventional transmission only can be transmitted from a portion of the array with less power. Apart from the power gain of the full array as compared to the subarray, this approach facilitates an averaging (diversity) gain in the effective estimation of BA. Hence, the advantages are twofold: power gain, averaging (diversity) gain.

Figure 1:
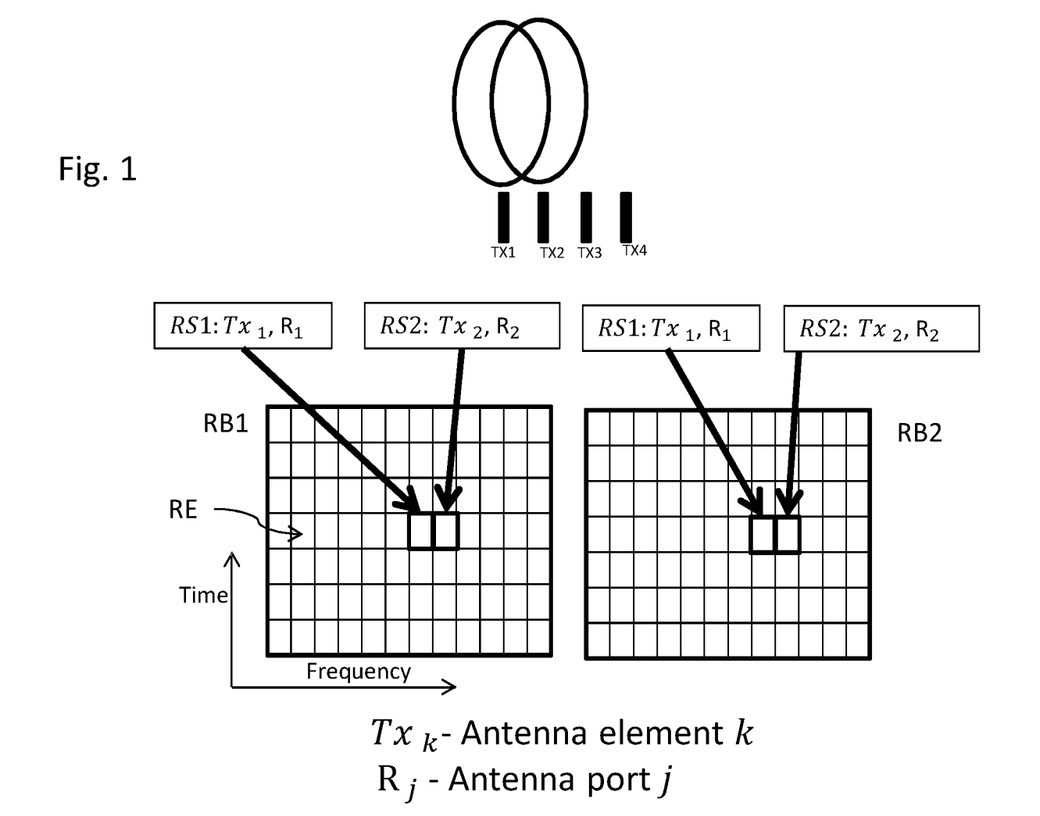
FIG. 1, showing a reference signaling setup.

Referring to FIG. 1, a simple example with an array with 4 antenna elements and a subarray of 2 antenna elements may be considered. Assume that the full array can transmit with a power that is 4*P and the subarray with 2*P, where P is the limited power a single antenna element can transmit (e.g., at a given point of time or within a specified time interval). In some applications, such as in DBF, two reference signals, for example CSI-RS, are transmitted from the two antennas of the subarray in order for the receiving node (in this example, a UE) to estimate the phase offset between the reference signals. This transmission may be based on a signal indication, which may be e.g. obtained from memory, and/or in response to measurement reports. The signal indication may indicate the described setup of antenna elements for reference signaling, in particular according to a standard like LTE. The reference signals may be represented by a port. A (first or original) signal map may be considered to be associated to the signal indication. It should be noted that while there are shown two reference signalings, variants with only one reference signaling (or more than two), and/or with different numbers of antenna elements, may be considered.

In a LoS (Line-of-Sight) situation, this offset is equivalent to the beam angle BA. For a fixed frequency, the part of the full array of 4 antennas defining the subarray of 2 antennas does not strongly impact thereupon. Typically, the reference signals are transmitted over the whole band, meaning that the power available from the antenna elements of the subarray is spread out over the resources (e.g., number of Resource Blocks, RB or Resource Elements) assigned to the UE (in downlink).

FIG. 1 exemplifies a case with two CSI-RS ports (representing a first and a second reference signal, respectively) set up or configured to be transmitted in 2 RBs (RB1, RB2) to the UE. In FIG. 1, the RBs are indicated as time-frequency resources and are represented as boxes covering 12 subcarriers (in frequency) and 7 symbols (in time, the 7 symbols correspond to a slot in LTE) each TX1, . . . , TX4 (or, more generally TXn) represent individual antenna elements, represented as (potential transmitting) antenna elements). TX1 and TX2 form the subarray to which the two reference signals are assigned or associated or mapped for transmission in each of the shown RBs. TX3 and TX4 may represent a second subarray. In this example, each reference signal covers one Resource Element in each of the RBs (RE, one symbol on one subcarrier, indicated by the small rectangles inside the RBs). It can be seen that the REs for the first port (first reference signaling) are disjunct from each other, but each is adjacent to a RE for the second port (second reference signaling).

The Resource Block structure shown in FIG. 1 represents a typical LTE time-frequency resource structure. Different structures, e.g. with a different number of symbols and/or subcarrier for a RB, may be considered.

Generally, a first reference signal RS1 (represented by a first port 1) may be transmitted in each Resource Block of a plurality of RBs utilising antenna element TX1, and/or a second reference signal RD2 (represented by a second port 2) in each of the Resource Blocks may be transmitted by antenna element TX2. A reference signal could be seen as covering and/or comprising disjunct subcarriers. It should be noted that in some variants, one or more antenna elements TXn could represent virtual antennas and/or subarrays.

The reference signals would appear (to the receiving node) to be repeated (in frequency space) over the 2 RBs using the same subarray, see FIG. 1. Further, it should be noted that the UE may be configured to produce one estimate covering the whole band assigned (and/or configured) to it (defined by the frequencies covered by the RBs assigned to the UE), which will give an averaging gain and remove varying BA effects from single frequency subcarriers.

Figure 2:
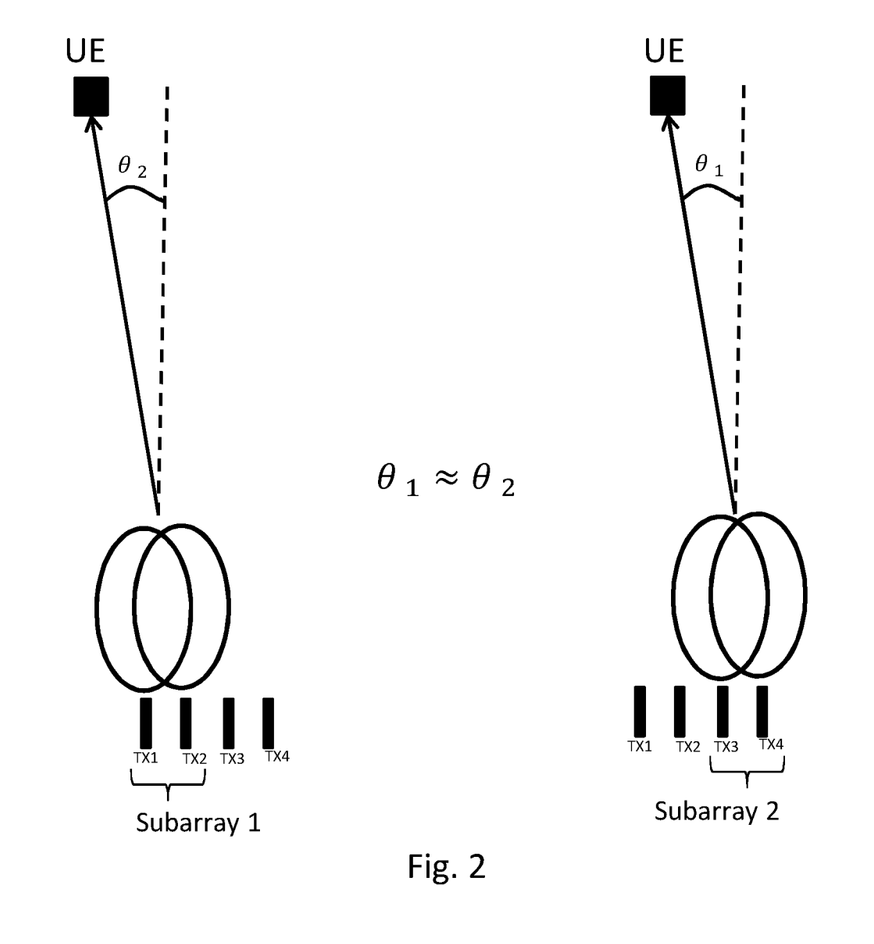
FIG. 2, showing beam angles.

The BA estimate over different parts of the array (for different subarrays) is rather consistent, illustrated in FIG. 2.

This is party due the typical distances between antenna elements and subarrays being significantly shorter than the distances to the receiving nodes. FIG. 2 illustrates the beam angle as it appears to a receiving node (UE) when signals forming the beam originate from different subarrays. As indicated, for (most) practical purposes, the beam angle is seen as independent from the subarray or antenna elements used. From the receiving node's point of view, the phase centers of the transmissions from the different antenna elements may be considered to coincide (at least, for practical and/or measurement purposes).

It may be considered to use 2 different subarrays (of 2 antenna elements in the example shown) to transmit the same two reference signals over 2 RBs (each with a power of 2*P), instead of using only one subarray, with half of the total power transmitting the same reference signals over the different RBs. Hence, the total transmitted power over all frequencies becomes 4*P, see FIG. 3. This example illustrates one way of implementation, which may be standard transparently if desired. The effective performance of the procedure could be improved by including extra signaling, which may signals the UE of the specific mapping between the subarrays and the RBs in order for the UE to be able to perform more accurate channel estimation, for instance.

In general terms, keeping the subarray antenna-port mappings similar over the remaining subarrays on the different RBs may be considered. A subarray may be defined as a subset of physical antenna-elements with a specific number, relative order, and relative spacing of the physical antenna elements. Two subarrays are said to be similar if the number and relative order of the individual elements is the same, and the relative physical spacing is similar (equal within an suitable error range).

A signal map, or mapping of reference signaling, and/or to one or more antenna elements, in particular subarray antenna-port mapping, may define and/or indicate phase information and/or amplitude information for transmitting using the antenna elements mapped. Such information may e.g. comprise and/or indicate the relative phase and/or amplitude offsets between the antenna elements of the antenna array or a subarray and/or the antenna elements mapped for transmission of the respective reference signaling. For example, different subarrays may have mapped different absolute phase and amplitude offsets for similar subarray antenna-port mappings.

An application of this approach is in the DBF procedure, in which the first steps of the procedure, only a part of the subarray is used to transmit reference signals.

In some embodiments, the receiving node (UE) is informed about the number of consecutive RBs used for separate subarray enabling channel estimation across RBs sent from the same subarray, e.g. by corresponding configuring. In some embodiments this is blindly detected by the UE. In some embodiments the number of consecutive RBs is configured based on an estimate of the coherence bandwidth. In some embodiment it is dependent on the total system bandwidth.

Note that in normal transmission of CSI-RS, the reference signals are spread out in frequency, which means that with a fixed port-antenna mapping (which typically is the case), all resources belonging to a certain port are used by the same subarray independent of the frequency band. This means that the shape of each antenna port will depend on the actual subarray. If many elements are to be utilized, each port is utilized by many antenna elements, typically leading to narrow beams.

According to approaches described herein, transmission on resources associated to a certain port may be provided by different subarrays on different frequency bands (subcarriers or RBs). The port-antenna mapping may be different depending on the frequency band. From the receiving node (UE) perspective, the difference between the channels (received reference signals, e.g. over the assigned transmission frequencies/subcarriers) related to (for example) two adjacent antennas (antenna elements) will be approximately the same no matter which pair of antennas that are considered on the array. Accordingly, any pair of antennas may be chosen (different subarrays maybe chosen). Thus, different pairs of antennas (antenna elements) may be used for transmission for different frequencies. For each CSI-RS resource on each frequency band, a lower number of antenna elements may be used per resource (as the subarray can be spread), allowing to shape the beam wider with full power utilization.

Figure 3:
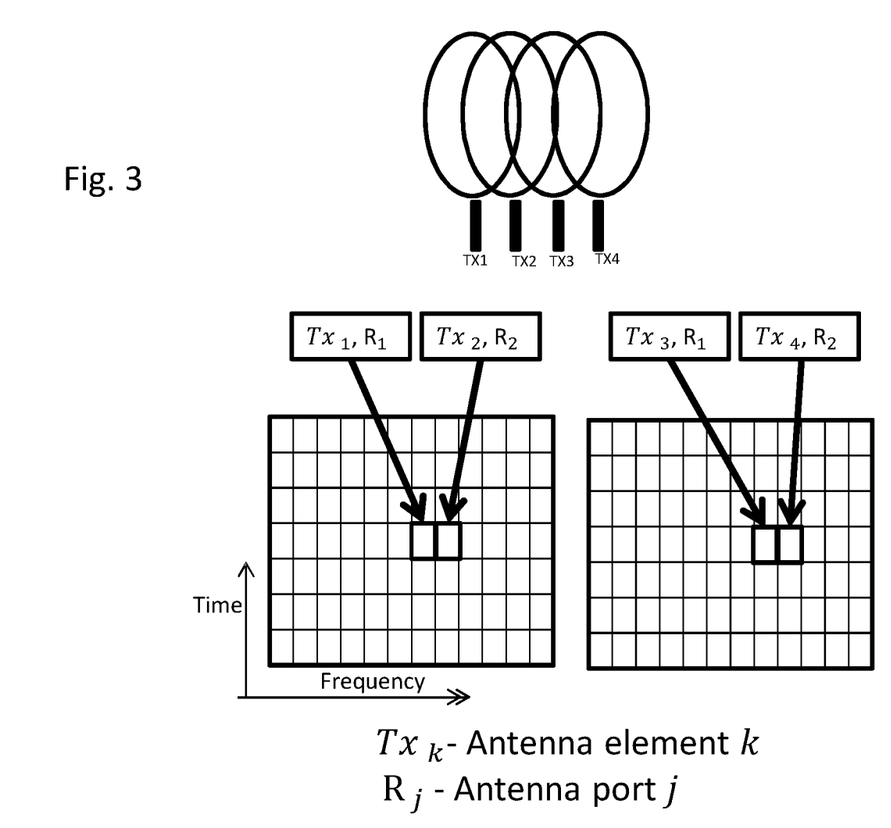
FIG. 3, showing another reference signaling setup.

This is illustrated by comparing FIG. 1 with FIG. 3. In FIG. 1, port 1 (reference signal RS1) is transmitted on $TX_1$ in both resource blocks, meaning that the total power of P available for TX1 will be spread between the RE elements of the RS1 with a. In FIG. 3, port 1 (RS1) is transmitted on both resource blocks, but by different TXs, allowing a total power of 2*P. Specifically, $TX_1$ is used on the first RB while $TX_3$ is used on the second RB. As the same principle is applied for port 2, for the different RB's, the relative phase difference will not have a significant difference as $TX_1$ should be compared with $TX_2$ and $TX_3$ with $TX_4$ (see FIG. 2).

Figure 4:
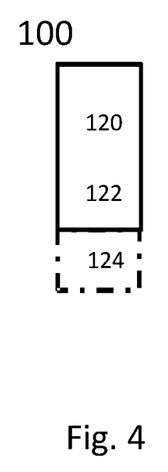
FIG. 4, showing an exemplary transmitting node.

FIG. 4 schematically shows an example of a transmitting node 100, which may be a network node, in particular may be a base station or eNodeB (also referred to as eNB). Node 100 comprises control circuitry 120, which may comprise a controller connected to a memory. The control circuitry 120 is operably connected to control radio circuitry 122 of the network node 100, which provides receiver and transmitter and/or transceiver functionality. An antenna circuitry 124 may be connected or connectable to radio circuitry 122 for signal reception or transmittance and/or amplification. The node 100 may be adapted to carry out any of the methods for operating a transmitting node disclosed herein; in particular, it may comprise corresponding circuitry, e.g. control circuitry. Modules of the node may be implemented in the circuitry of the node, e.g. in software and/or hardware and/or firmware.

Figure 5:
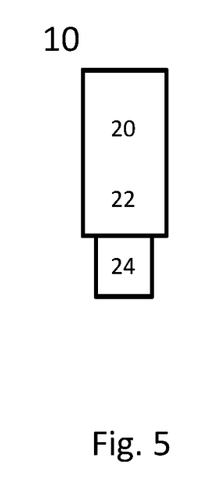
FIG. 5, showing an exemplary receiving node.

FIG. 5 schematically shows a receiving node 10, which may in particular be implemented as a terminal or user equipment. Node 10 comprises control circuitry 20, which may comprise a controller connected to a memory. Node 10 also comprises radio circuitry 22 providing receiving and transmitting or transceiving functionality, the radio circuitry 22 connected or connectable to the control circuitry. An antenna circuitry 24 of the node 10 is connected or connectable to the radio circuitry 22 to collect or send and/or amplify signals. Radio circuitry 22 and the control circuitry 20 controlling it are configured for cellular communication with a network, in particular a network node or transmitting node or base station. The node 10 may be adapted to carry out any of the methods for operating a receiving node disclosed herein; in particular, it may comprise corresponding circuitry, e.g. control circuitry. Modules of the receiving node may be implemented in the circuitry of the receiving node, e.g. in software and/or hardware and/or firmware.

Generally, it is suggested using different antenna elements on different frequency bands for the same port, in particular to utilize the property in FIG. 2, allowing for example to get correct feedback of PMI. It may be considered that reference signals, intended to be transmitted over one subarray, may be transmitted over more than one subarray or all remaining subarrays over different frequencies.

There may be considered a method for operating a transmitting node for mapping an antenna port to physical antenna elements, comprising using a first port-to-antenna mapping for a first set of the frequency band, using a second port-to-antenna mapping for a second part of the frequency band. The antenna ports (reference signaling) may be for a CSI process or CSI estimation. It may generally be considered that disjunct frequency bands of a plurality of frequency bands represent parts of the frequency band represented by the total of the plurality of frequency bands. There may be considered a second antenna port with a third and a fourth port-to-antenna mapping, wherein the relation between the said first and said third port to antenna mapping is similar to the relation between the said second and said fourth, in terms of phase center separation.

An antenna array may generally comprise a plurality of antenna elements, in particular for wireless transmission and/or reception. The antenna array may be adapted for MIMO (Multiple-Input, Multiple/Output) operation. The plurality of antenna elements in particular may comprise a multitude or power of 2 antenna elements, in particular 8 or more than 8 antenna elements. Each antenna element may be a physical antenna element and/or be independently controllable. An antenna element may be considered independently controllable if it can be supplied with a signal and/or electromagnetic current independent and/or separately from another antenna element.

To each antenna element may be associated at least one amplifier and/or pre-amplifier, which may independently controllable in an analogous manner. An antenna element and its associated amplifier/s and/or pre-amplifier/s may be controllable together. Generally, the antenna elements of an antenna array may be arranged such that beamforming (in particular spatial beamforming) may be performed utilizing and/or controlling the antenna elements. A subarray of the antenna array may comprise one or more antenna elements of the antenna array, in particular one or more than one independently controllable antenna elements. An antenna array or subarray may be a two-dimensional array (e.g., arranged in a plane) or a three-dimensional array.

Generally, an antenna element may be a physical antenna element or a virtual antenna element. A virtual antenna element may comprise and/or provide a mapping to and/or represent, one or more physical antenna elements, and/or provide a logical representation of the physical antenna element/s as one virtual antenna element. A virtual antenna element may represent a subarray of antenna elements, which may comprise one or more than on physical antenna elements. An antenna element, in particular a physical antenna element, may be controllable separately from other (physical antenna elements), in particular for transmission.

Such an antenna element may also be referred to as steerable antenna element. It may be considered that separately controllable antenna elements may be operated with different transmission parameters, e.g. in terms of transmission power and/or phase of a transmission and/or transmission frequency (of transmitted radiation) and/or polarization. It may be considered that a physical antenna element has associated to it and/or comprises a power amplifier, which may be separately operable from power amplifiers associated to other power amplifiers of other physical antenna elements. Antenna elements may be considered different, if they have or are associated to at least one different physical antenna element.

The term antenna port, or short port, may pertain to a mapping of a channel and/or transmission parameters and/or (associated) signaling to one or more antenna elements and/or a subarray of antennas. Generally, an antenna ports may be seen as logical entities distinguished by their reference signal sequences. A port may e.g. be defined in a telecommunications standard like LTE. A port may represent a signaling and a mapping of the at least one signaling to a plurality of antenna elements, and may generally be associated to a precoder (corresponding to the mapping). The signaling may comprise a reference signal, in particular a reference signal pertaining to channel state information, e.g. a CSI-RS (Channel State Information-Reference Signal). There may generally be defined a given (and/or limited) number of different ports, e.g. according to a standard. The number of ports may e.g. be 8, or more generally a multitude of 2.

Beamformed transmission of signaling may comprise beamforming to transmit a beam pattern. Beamforming may be based on a precoder. A precoder may represent a beamforming configuration, in particular a mapping for a signal to a plurality of antenna elements, in particular for beamforming and/or MIMO operation. It may be considered that a precoder is represented by a matrix and/or comprises weights for controlling different antenna elements of a subarray for beamforming. A precoder, in particular a first or second precoder (e.g., of a first iteration described herein) may be associated to a codebook. A codebook may comprise a plurality of precoders associated to allowed beamforming configurations, e.g. based on a standard like LTE and/or operating conditions, based on which a standard-defined codebook for example may be limited. When beamforming, a desired signaling is provided by the overlay of the radiation patterns transmitted by the antenna elements of the subarray used for beamforming according to the precoder used. A precoder may generally be associated to and/or pertain to and/or address a subarray of antenna elements used for beamforming to provide the desired signaling (respectively port).

Signaling may comprise one or more signals and/or symbols, e.g. one or more reference signals or symbols like CSI-RS. A beam pattern (in particular, an angular and/or spatial distribution and/or field structure) may be associated to a port. Symbols or signals of signaling (respectively a port) may be defined to allow estimation of the associated channel by a receiver or receiving node, e.g. a terminal like a UE. Estimation of a channel may comprise measurements of the signaling, in particular reference signals associated to the channel and/or port. Such measurements may comprise measurements related to amplitude and/or phase (or phase difference) and/or frequency and/or duration and/or Signal-to-Noise (e.g., SINR, SIR and/or SNR). Different subarrays of an antenna array may differ in at least one antenna element.

Reference signaling may comprise one or more reference signals or symbols. Reference signals may be adapted or intended for a receiver (e.g., a terminal) to perform measurements on and/or to provide a measurement report on. Reference signals may be defined by a standard, e.g. CSI-RS defined by LTE. Measurement reporting and/or providing a measurement report may generally comprise transmitting a measurement report, in particular to a source/transmitter of reference signaling, e.g. a transmitting node or network node, and/or performing measurements, e.g. on reference signaling, and/or evaluating measurements (e.g., processing the measurement results). A measurement report may be based on the performed measurements and/or the evaluating.

Generally, reference signaling may be cell-specific or receiver-specific. CSI-RS may be considered an example for receiver-specific reference signaling. Receiver-specific reference signaling may be intended for a specific receiver to perform measurements on, the receiver may be configured accordingly. Cell-specific reference signaling may be intended for all (or at least an unspecified number of) receivers in the cell to perform measurements on. Transmitting a reference signaling on more than one antenna element may comprise beamforming (e.g., of the reference signaling). Transmitting different reference signalings (e.g., a first and a second reference signaling), and/or on different antenna elements (for the same and/or different reference signaling) may be performed simultaneously, e.g. in the same time interval (e.g., symbol time interval, which may associated to a subframe), and/or such that symbols or signals of one reference signaling coincide with symbols or signals of the other reference signaling. A symbol of a reference signal may cover and/or comprise and/or represent one Resource Element, and/or a symbol time interval and an associated frequency range, e.g. a subcarrier.

Configuring (e.g., with or for a configuration) a device like a receiving node or transmitting node may comprise bringing the device into a state in accordance with the configuration. A device may generally configure itself, e.g. by adapting a configuration. Configuring a receiving node, e.g. by a network node, may comprise transmitting a configuration or configuration data indicating a configuration to the receiving node, and/or instructing the receiving node, e.g. via transmission of configuration data, to adapt the configuration configured.

A configuration may in particular pertain to measurement reporting, e.g. to a CSI process. Measurement reporting may generally pertain to specific signaling (or an associated port), which may be indicated or configured to the terminal by the network or network node, e.g. by transmitting corresponding configuration data. Measurement reporting may generally indicate a preferred port or port combination (or precoder or precoder combination) to be used, which may be referred to as port or precoder selection.

A CSI process may generally comprise receiving (e.g., by a UE), from a transmitting node or network node, reference signaling (CSI-RS), and providing a measurement report based on the received reference signaling. The measurement report may in particular indicate or comprise CSI information, in particular CQI (Channel Quality Indicator), PMI (Precoding Matrix Indicator) and/or RI (Rank Indicator).

A transmitting node may in particular be implemented as a network node, but is not limited thereto (an implementation as terminal may be considered). A receiving node may in particular be implemented as a terminal, or a network node.

A phase center (or apparent phase center) of radiation may be considered as the apparent source of radiation (signaling), in particular as seen by a receiver, which may be the intended receiving node like a terminal. A phase center difference may be a difference, in particular a spatial difference, between the phase centers of two signalings. Two phase center differences may be considered to be corresponding to each other (or be constant under remapping) if they have the same numerical value and/or are essentially equal or equal. Two phase center differences may be considered to be essentially equal if their values lie within 10% or less, or 5% or less, or 1% or less (of the magnitude of the larger magnitude phase center difference) of each other. This may be dependent on the distance between the receiving node and the antenna array, and/or the arrangement of the (physical) antenna elements used for transmission.

A node, transmitting node or receiving node, in particular a network node of or for a wireless communication network may be a node adapted for wireless and/or radio communication, e.g. a radio network node. Such a node may generally be a base station, which may be adapted for radio communication with one or more terminals. A network node may in particular be an eNodeB (in particular according to LTE or a related standard). It may be considered that a node like network node is part of a Radio Access Network (RAN). A network node and/or RAN may be connected or connectable to a core network. Generally, a transmitting node or receiving node, or a network node, may comprise control circuitry and/or radio circuitry and/or be connected or connectable to antenna circuitry and/or an antenna array. A transmitting node or network node and/or associated circuitry like its control circuitry and/or radio circuitry may be adapted for beamforming and/or use of an antenna array with a plurality of antenna elements for transmission.

A terminal may be a terminal device adapted for wireless and/or radio communication, in particular a user equipment (e.g., according to LTE). A terminal may be adapted to communicate with and/or via a Radio Access Network (RAN) and/or a network node. Generally, a terminal may comprise control circuitry and/or radio circuitry and/or be connected or connectable to antenna circuitry and/or an antenna array.

Control circuitry may comprise one or more control devices like (micro-)processors (and/or processor cores) and/or controllers and/or microcontrollers and/or ASICs (Application Specific Integrated Circuit) and/or FPGAs (Field-Programmable Gate Array) and/or any integrated circuitry suitable for control functions as described herein. Control circuitry may comprise and/or be connected or connectable to a memory arrangement, which may comprise one or more memories readable by one or more control devices of the control circuitry. A memory may generally be a volatile or non-volatile memory, e.g. Random Access Memory (RAM) and/or Read-Only Memory (ROM) and/or flash memory and/or buffer memory and/or cache memory and/or optical memory and/or magnetic memory. A storage medium may comprise one or more of such memories.

Radio circuitry may be adapted for transmitting and/or receiving and/or transceiving signaling, in particular wireless and/or radio signaling. It may comprise one or more transmitters and/or receivers and/or transceivers. Radio circuitry may be controllable by, and/or be connected or connectable to, control circuitry. Generally, radio circuitry may be connected or connectable to antenna circuitry and/or an antenna array, to transmit and/or receive signaling utilising the antenna array, respectively antenna element/s and/or subarray/s thereof. Radio circuitry may comprise suitable components (e.g., pre-amplifying and/or amplifying circuitry and/or measurement circuitry and/or oscillatory circuitry and/or power control circuitry and/or filtering circuitry) for transmission and/or reception and/or detection and/or processing signaling, in particular controlled by and/or in cooperation with control circuitry. Processing signaling may generally comprise detecting and/or encoding/decoding and/or modulating/demodulating signaling. Antenna circuitry may comprise an antenna array and/or corresponding circuitry.

A wireless communication network may generally be any network providing radio access for telecommunication. It may comprise a Radio Access Network (RAN), e.g. according to UMTS, LTE or a related standard, a Next Radio standard or generally a 4G or 5G standard. A network node may generally be any radio network node, e.g. of a RAN. For example, a network node may be a base station, eNodeB, macro node, micro node, relay node, etc. A terminal may be any device providing a possible termination point for telecommunication utilising the wireless communication network. The terminal may be adapted for communication with or via the network, in particular a network node of the network. A terminal may be implemented as a user equipment (UE), or Machine-Type-Communication (MTC) device. It may be considered that a terminal is mobile, however, stationary terminals may be envisioned. A terminal may in particular be a smartphone, mobile phone, tablet, laptop, desktop computer, sensor arrangement or a machine adapted e.g. for MTC.

Some useful abbreviations include:

| Abbreviation | Explanation |
| --- | --- |
| BA | Beam Angle |
| BS | Base Station |
| CSI | Channel-State Information |
| CSI-RS | CSI reference signal/s |
| CQI | Channel-Quality Indicator |
| DBF | Differential Beamforming |
| LoS | Line of Sight |
| LTE | Long-Term Evolution, a telecommunications standard |
| RAS | Reconfigurable Antenna Systems |
| RB | Resource Block |
| RI | Rank Indicator |
| RX | Reception, reception-related, Receiver |
| SINR | Signal-to-Interference and Noise Ratio |
| SIR | Signal-to-Interference Ratio |
| SNR | Signal-to-Noise Ratio |
| TX | Transmission, transmission-related, Transmitter |
| UE | User Equipment |

These abbreviations may be used according to LTE standard use, if applicable.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

The invention claimed is:

1. A method for operating a transmitting node of a wireless communication network, the transmitting node one of comprising and being connected to an antenna array having multiple antenna elements, the method comprising:
   obtaining a signal indication indicating at least one of a first reference signaling and a second reference signaling, the first reference signaling comprising transmission on a first plurality of disjunct frequency bands, the second reference signaling comprising transmission on a second plurality of disjunct frequency bands;
   transmitting the at least one of the first reference signaling and the second reference signaling based on a signal map of the first and the second reference signaling to antenna elements of the antenna array; and at least one of:
      the signal map mapping the first reference signaling such that transmission on a first frequency band of the first plurality of disjunct frequency bands and transmission on a second frequency band of the first plurality of disjunct frequency bands are mapped to two antenna elements; and
      the signal map mapping transmission of the second reference signaling such that transmission on a first frequency band of the second plurality of disjunct frequency bands and transmission on a second frequency band of the second plurality of disjunct frequency bands are mapped to two antenna elements.

2. The method according to claim 1, wherein the signal indication indicates a mapping of the first reference signaling and the second reference signaling to a subarray of the antenna array, wherein the first reference signaling is mapped for transmission on a first antenna element of the subarray, and the second reference signaling is mapped for transmission on a second antenna element of the subarray.

3. The method according to claim 2, wherein the signal indication indicates at least one of a first port and a second port, the first port being associated to the at least one of the first reference signaling and the second port being associated to the second reference signaling.

4. The method according to claim 2, wherein at least one of:
   the signal map mapping transmission of the first reference signaling such that transmission on the first frequency band of the first plurality of disjunct frequency bands is mapped to a different antenna element than transmission on the second frequency band of the first plurality of disjunct frequency bands; and
   the signal map mapping transmission of the second reference signaling such that transmission on the first frequency band of the second plurality of disjunct frequency bands is mapped to a different antenna element than transmission on the second frequency band of the second plurality of disjunct frequency bands.

5. The method according to claim 2, wherein at least one of:
   the signal map mapping transmission of the first reference signaling such that transmission on the first frequency band of the first plurality of disjunct frequency bands and transmission on the second frequency band of the first plurality of disjunct frequency bands is mapped to both antenna elements; and
   the signal map mapping transmission of the second reference signaling such that transmission on the first frequency band of the second plurality of disjunct frequency bands and transmission on the second frequency band of the second plurality of disjunct frequency bands is mapped to both antenna elements.

6. The method according to claim 2, wherein the at least one of the first reference signaling and the second reference signaling one of comprise and represent receiver-specific reference signaling.

7. The method according to claim 6, wherein the receiver-specific reference signaling is CSI-RS signaling.

8. The method according to claim 2, wherein a disjunct frequency band represents at least one of one subcarrier and a grouping of adjacent subcarriers.

9. The method according to claim 1, wherein the signal indication indicates at least one of a first port and a second port, the first port being associated to the at least one of the first reference signaling and the second port being associated to the second reference signaling.

10. The method according to claim 1, wherein at least one of:
    the signal map mapping transmission of the first reference signaling such that transmission on the first frequency band of the first plurality of disjunct frequency bands is mapped to a different antenna element than transmission on the second frequency band of the first plurality of disjunct frequency bands; and
    the signal map mapping transmission of the second reference signaling such that transmission on the first frequency band of the second plurality of disjunct frequency bands is mapped to a different antenna element than transmission on the second frequency band of the second plurality of disjunct frequency bands.

11. The method according to claim 1, wherein at least one of:
    the signal map mapping transmission of the first reference signaling such that transmission on the first frequency band of the first plurality of disjunct frequency bands and transmission on the second frequency band of the first plurality of disjunct frequency bands is mapped to both antenna elements; and
    the signal map mapping transmission of the second reference signaling such that transmission on the first frequency band of the second plurality of disjunct frequency bands and transmission on the second frequency band of the second plurality of disjunct frequency bands is mapped to both antenna elements.

12. The method according to claim 1, wherein the at least one of the first reference signaling and the second reference signaling one of comprise and represent receiver-specific reference signaling.

13. The method according to claim 12, wherein the receiver-specific reference signaling is CSI-RS signaling.

14. The method according to claim 1, wherein a disjunct frequency band represents at least one of one subcarrier and a grouping of adjacent subcarriers.

15. The method according to claim 1, wherein at least one frequency band of the first plurality of frequency bands is adjacent to at least one frequency band of the second plurality of frequency bands.

16. The method according to claim 1, wherein disjunct frequency bands of one of the at least one of the first and the second plurality of frequency bands are in different Resource Blocks.

17. The method according to claim 1, further comprising configuring a receiving node with a measurement configuration indicating the signal map.

18. A transmitting node for a wireless communication network, the transmitting node being at least one of:
one of connected and connectable to; and
comprising, an antenna array having multiple antenna elements, the transmitting node being configured to
obtain a signal indication indicating at least one of a first reference signaling and a second reference signaling, the first reference signaling comprising transmission on a first plurality of disjunct frequency bands, the second reference signaling comprising transmission on a second plurality of disjunct frequency bands;
transmit the at least one of the first reference signaling and the second reference signaling based on a signal map of the first and the second reference signaling to antenna elements of the antenna array; and at least one of:
the signal map mapping the first reference signaling such that transmission on a first frequency band of the first plurality of disjunct frequency bands and transmission on a second frequency band of the first plurality of disjunct frequency bands are mapped to two antenna elements; and
the signal map mapping transmission of the second reference signaling such that transmission on a first frequency band of the second plurality of disjunct frequency bands and transmission on a second frequency band of the second plurality of disjunct frequency bands are mapped to two antenna elements.

19. A method for operating a receiving node in a wireless communication network, the method comprising:
providing a measurement report on reference signaling received from a transmitting node of the wireless communication network based on a measurement configuration, the measurement configuration indicating a signal map of a first and a second reference signaling to antenna elements of an antenna array used by the transmitting node for transmission of the reference signaling, and at least one of:
the signal map mapping transmission of the first reference signaling such that transmission on a first frequency band of the first plurality of disjunct frequency bands and transmission on a second frequency band of the first plurality of disjunct frequency bands are mapped to two antenna elements; and
the signal map mapping transmission of the second reference signaling such that transmission on a first frequency band of the second plurality of disjunct frequency bands and transmission on a second frequency band of the second plurality of disjunct frequency bands are mapped to two antenna elements.

20. A receiving node for a wireless communication network, the receiving node being configured to
provide a measurement report on reference signaling received from a transmitting node of the wireless communication network based on a measurement configuration, the measurement configuration indicating a signal map of a first and a second reference signaling to antenna elements of an antenna array used by the transmitting node for transmission of the reference signaling, and at least one of:
the signal map mapping transmission of the first reference signaling such that transmission on a first frequency band of the first plurality of disjunct frequency bands and transmission on a second frequency band of the first plurality of disjunct frequency bands are mapped to two antenna elements; and
the signal map mapping transmission of the second reference signaling such that transmission on a first frequency band of the second plurality of disjunct frequency bands and transmission on a second frequency band of the second plurality of disjunct frequency bands are mapped to two antenna elements.

* * * * *